United States Patent
Muto

(10) Patent No.: US 11,826,795 B2
(45) Date of Patent: Nov. 28, 2023

(54) METHOD FOR CLEANING ROLLING BEARING AND ROLLING BEARING CLEANING DEVICE

(71) Applicant: JAMCO CORPORATION, Tokyo (JP)

(72) Inventor: Akira Muto, Chiba (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 17/801,583

(22) PCT Filed: Feb. 27, 2020

(86) PCT No.: PCT/JP2020/008057
§ 371 (c)(1),
(2) Date: Aug. 23, 2022

(87) PCT Pub. No.: WO2021/171491
PCT Pub. Date: Sep. 2, 2021

(65) Prior Publication Data
US 2023/0083145 A1    Mar. 16, 2023

(51) Int. Cl.
*B08B 3/04* (2006.01)
*B08B 13/00* (2006.01)

(52) U.S. Cl.
CPC .............. *B08B 3/041* (2013.01); *B08B 13/00* (2013.01)

(58) Field of Classification Search
CPC ............ B08B 3/041; B08B 13/00; B08B 3/04
See application file for complete search history.

(56) References Cited

U.S. PATENT DOCUMENTS

2004/0168704 A1    9/2004  Mizuno et al.

FOREIGN PATENT DOCUMENTS

| JP | H07-108230 A | 4/1995 | |
| JP | 2001-129497 A | 5/2001 | |
| KR | 20090099935 A | * 9/2009 | ............... B05B 1/14 |

OTHER PUBLICATIONS

Machine translation of KR-20090099935-A (Year: 2009).*
International Search Report for corresponding Application No. PCT/JP2020/008057, dated Apr. 14, 2020.
Written Opinion for corresponding Application No. PCT/JP2020/008057, dated Apr. 14, 2020.

* cited by examiner

*Primary Examiner* — Erin F Bergner
(74) *Attorney, Agent, or Firm* — Renner, Otto, Boisselle & Sklar, LLP

(57) ABSTRACT

Provided is a method for cleaning a rolling bearing and a rolling bearing cleaning device capable of cleaning a rolling bearing easily in a short time. The method for cleaning a rolling bearing including a plurality of rolling elements and a race provided with a race groove along which the rolling elements roll involves arranging a cleaning liquid in a pressurized state on one side in an axial direction of the rolling bearing across a whole circumference thereof with respect to a gap between the rolling elements and the race groove, and cleaning the rolling bearing by passing the cleaning liquid through the gap from one side in the axial direction toward the gap on the other side thereof.

5 Claims, 7 Drawing Sheets

METHOD FOR CLEANING ROLLING BEARING AND ROLLING BEARING CLEANING DEVICE

TECHNICAL FIELD

The present invention relates to a method for cleaning rolling bearings and a rolling bearing cleaning device.

BACKGROUND ART

Aircrafts are provided with rolling bearings to support wheels in a rotatable manner. A general rolling bearing is provided with a plurality of rolling elements such as rollers and balls, a cage for retaining the rolling elements, and a race along which the rolling elements roll. Further, lubricating oil such as grease is applied to the rolling bearing to suppress abrasion between the rolling elements and the race.

Periodic maintenance is required in aircrafts. During maintenance, the parts that support the wheels are disassembled, and each part is subjected to inspection. Rolling bearings are also subjected to inspection at this timing, but grease attached to the bearings hinders the inspection. Therefore, the disassembled rolling bearings are cleaned prior to the inspection.

However, the rolling bearings of aircrafts have a wide operating temperature that ranges between a low temperature range of −50° C. or lower and a high temperature range of +150° C. or higher, for example, such that special grease containing an adjusted thickener is used. There is a drawback in that such grease cannot be removed easily by simply spraying a general cleaning liquid thereto.

Meanwhile, Patent Document 1 discloses a method for cleaning a rolling bearing, wherein a cylindrical rotor provided with a spiral groove is interposed in a cleaning liquid supply path, the cylindrical rotor is rotated by supplying cleaning liquid, and a high-pressure cleaning liquid is supplied from the cylindrical rotor to the bearing to be cleaned, to thereby clean the rolling bearing.

CITATION LIST

Patent Document

[Patent Document 1] Japanese Patent Application Laid-Open Publication No. 2001-129497

DISCLOSURE OF THE INVENTION

Problems to be Solved by the Invention

However, even by adopting the cleaning method disclosed in Patent Document 1, it may not be possible to remove the grease that has entered the narrow gap between the rolling elements and the race. Further according to the cleaning method disclosed in Patent Document 1, since the cleaning liquid is mainly suppled between two races, there is a drawback in that the soiling on an outer surface of the rolling bearing tends to remain. Therefore, when cleaning the rolling bearings, operators must roll the rolling elements by hand to clean the same, so that the cleaning takes much time.

Therefore, the present invention aims at providing a method for cleaning rolling bearings and a rolling bearing cleaning device capable of cleaning the rolling bearings easily in a short time.

Means of Solving the Problems

In order to achieve the objects mentioned above, a method for cleaning a rolling bearing according to the present invention includes a plurality of rolling elements, and a race provided with a race groove along which the rolling elements roll, the method characterizes in arranging a cleaning liquid in a pressurized state on one side in an axial direction of the rolling bearing across a whole circumference thereof with respect to a gap between the rolling elements and the race groove, and cleaning the rolling bearing by passing the cleaning liquid through the gap from one side in the axial direction toward the gap on the other side thereof.

A rolling bearing cleaning device according to the present invention for cleaning a rolling bearing includes a plurality of rolling elements, a cage configured to retain the rolling elements, and a race along which the rolling elements roll, wherein the device characterizes in including a case having a hollow cylindrical shape including a tapered inner circumferential surface that abuts against a whole circumference of the cage, a closing body configured to cover an inner side of the race, a cover configured to cover one end of the case, and a pressurizing device configured to pressurize a cleaning liquid retained between the cover and the rolling bearing in an interior space of the case.

A rolling bearing cleaning device according to the present invention for cleaning a rolling bearing includes a plurality of rolling elements, and an inner race and an outer race along which the rolling elements roll, wherein the device characterizes in including a case having a hollow cylindrical shape comprising a tapered inner circumferential surface that abuts against a whole circumference of the outer race, a closing body configured to cover an inner side of the inner race, a cover configured to cover one end of the case, and a pressurizing device configured to pressurize a cleaning liquid retained between the cover and the rolling bearing in an interior space of the case.

Effects of the Invention

According to the present invention, a method for cleaning a rolling bearing and rolling bearing cleaning device capable of cleaning rolling bearings easily in a short time can be provided.

MODE FOR CARRYING OUT THE INVENTION

First Embodiment

Figure 1:
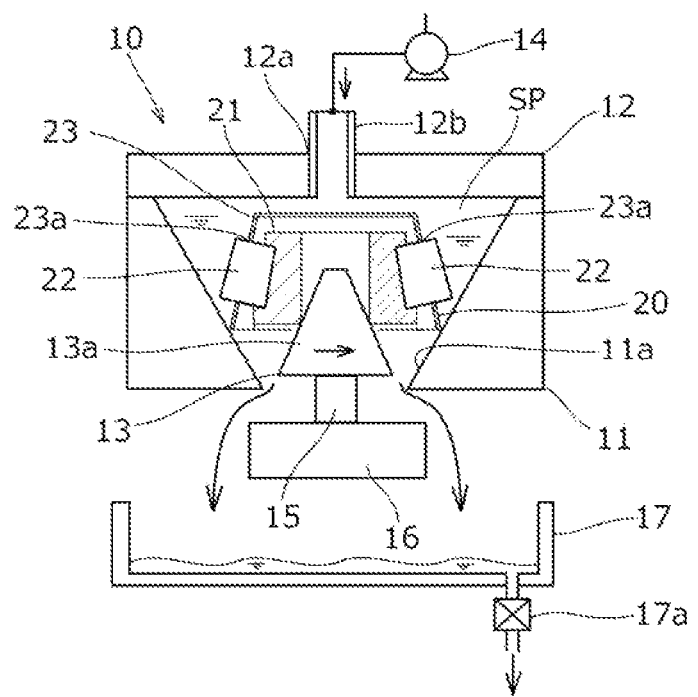
FIG. 1 is a schematic diagram of a rolling bearing cleaning device according to a first embodiment.
Figure 2:
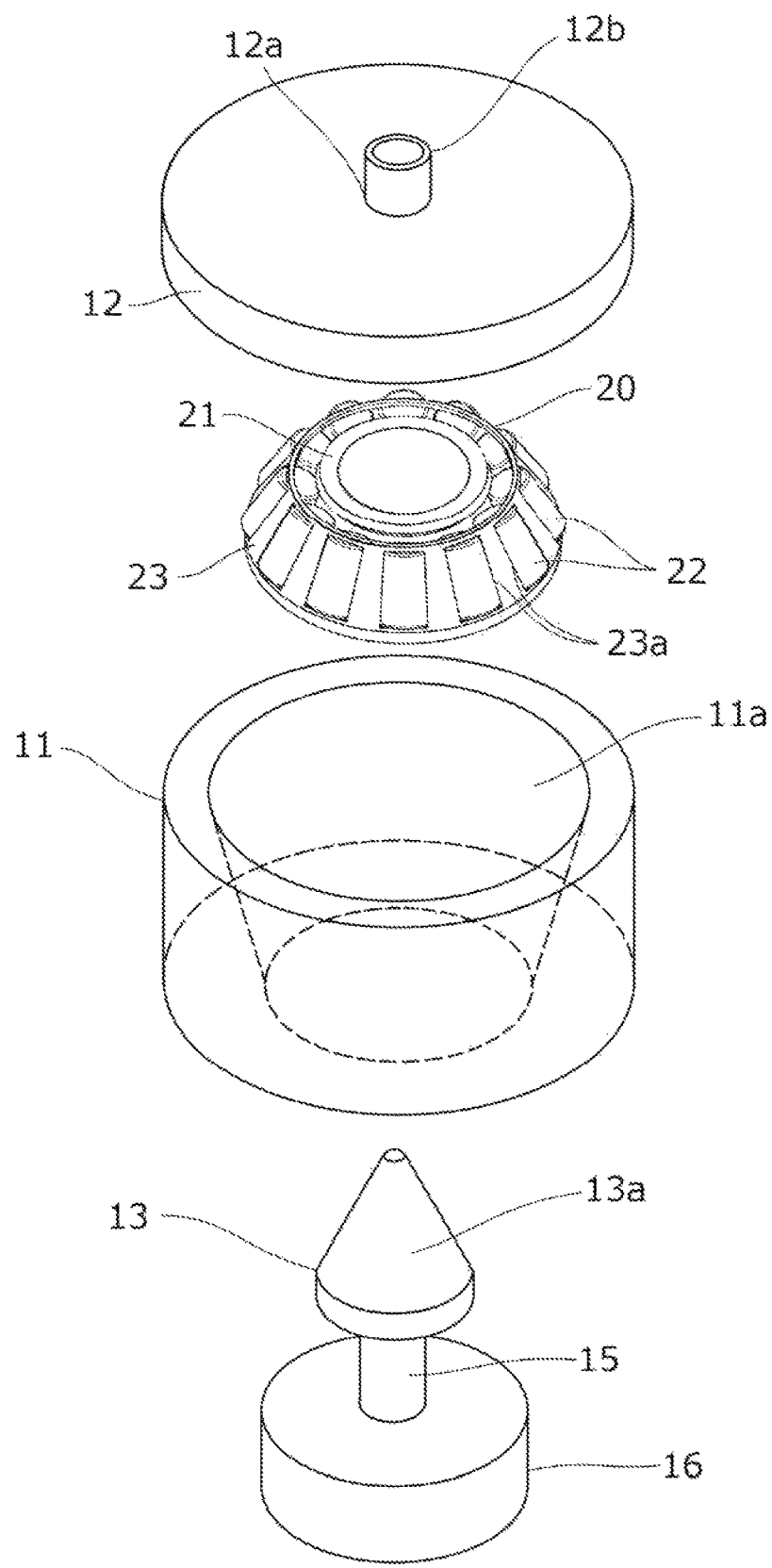
FIG. 2 is a perspective view illustrating essential parts of the rolling bearing cleaning device according to the present embodiment in exploded view.

FIG. 1 is a schematic drawing of a rolling bearing cleaning device according to a first embodiment of the present invention. FIG. 2 is a perspective view illustrating essential parts of the rolling bearing cleaning device according to the present embodiment in exploded view. In the present specification, in order to simply the description, an upper direction of FIG. 1 is referred to as an "upper direction of the apparatus", and a lower direction of FIG. 1 is referred to as a "lower direction of the apparatus", but a cleaning device 10 can be used regardless of the gravity direction.

The rolling bearing cleaning device 10 includes a case 11 having a hollow cylindrical shape, a cover 12 having a disk shape that covers an upper end of the case 11, and a plug (closing body) 13 having a conical shape arranged at a center of a lower end of the case 11. It is preferable to form the case 11 and the cover from of a transparent resin material such as acryl, since it allows the state of cleaning to be observed from an exterior. The plug 13 can be composed of a disk having a smaller diameter than the cage, as long as it is capable of covering an inner side of an inner race of the rolling bearing.

As illustrated in the drawing, the case 11 includes a tapered inner circumferential surface 11a whose diameter expands toward the upper direction and whose upper and lower ends are opened. The diameter of the cover 12 is approximately equal to the outer diameter of the case 11, and an opening 12a is formed at a center thereof. The opening 12a is connected to a circular pipe 12b, and the circular pipe 12b is connected to a cleaning liquid supply apparatus (pressurizing device) 14 disposed on an outer side. The cleaning liquid supply apparatus 14 is capable of force-feeding the cleaning liquid with a predetermined pressure.

The cover 12 is assembled air-tightly to the upper end of the case 11 via a bolt and the like not shown. In doing so, a seal ring or the like can be interposed between the case 11 and the cover 12. The method for assembling the case 11 and the cover 12 is not limited to a bolt engagement, and it can be a screw engagement.

The plug 13 has a tapered outer circumferential surface 13a whose diameter expands toward the lower direction, the lower end thereof being connected to an upper end of a drive shaft 15. A lower end of the drive shaft 15 is connected to an actuator 16 that drives the drive shaft 15 to rotate. The plug 13, the drive shaft 15, and the actuator 16 are capable of being moved up and down by a lifting mechanism not shown. As for the lifting mechanism, the mechanism used in a second embodiment described below can be used preferably.

A cleaning liquid pan 17 that receives cleaning liquid which has fallen is provided below the cleaning device 10. The cleaning liquid received by the cleaning liquid pan 17 is filtered of foreign matter such as grease by a filter 17a, and may be pooled separately to be reused.

Alkaline aqueous solution that can be acquired at a low cost compared to petroleum-based fluids can be used preferably as the cleaning liquid, but the cleaning liquid is not limited thereto, and for example, tap water and the like can also be used.

In this description, a tapered roller bearing 20 is described as an example of a rolling bearing that can be cleaned by the cleaning device 10. The tapered roller bearing 20 includes an outer race not shown, an inner race 21, a plurality of tapered rollers 22 that roll between the races, and a cage 23 having rectangular openings 23a for retaining the respective tapered rollers 22. The outer race of the tapered roller bearing 20 can be easily disassembled and cleaned, so that it is not illustrated here.

Next, a cleaning method using the rolling bearing cleaning device 10 will be described. At first, in a state where the cover 12 is removed, the plug 13, the drive shaft 15, and the actuator 16 are moved in the upper direction using a lifting mechanism not shown. Next, the tapered roller bearing 20 is inserted through an opening of the case 11 opened to the upper direction, and the inner race 21 is placed on the tapered outer circumferential surface 13a of the plug 13. Thereby, the lower end of the inner race 21 is abutted against the whole circumference of the tapered outer circumferential surface 13a, and an inner side of the inner race 21 is covered.

Thereafter, the lifting mechanism is used to move the plug 13, the drive shaft 15, and the actuator 16 to the lower direction, by which the tapered roller bearing 20 supported by the plug 13 is also moved to the lower direction, such that the whole circumference of the lower end of the cage 23 abuts against the tapered inner circumferential surface 11a of the case 11, and the lifting mechanism is stopped at that point of time. At that point of time, the lower end of the inner race 21 is still abutted against the tapered outer circumferential surface 13a across the whole circumference.

Further, it is possible to have an operator hold the tapered roller bearing 20 manually without using the lifting mechanism and position the same such that the cage 23 is abutted against the tapered inner circumferential surface 11a and the inner race 21 abuts against the tapered outer circumferential surface 13a.

Since it is not necessary to fix the tapered roller bearing 20 to be cleaned to the case 11, the present embodiment has superior workability. Further, since the cage 23 abuts against an area of the tapered inner circumferential surface 11a according to the outer diameter of the tapered roller bearing 20, and similarly, the inner race 21 abuts against an area of the tapered outer circumferential surface 13a according to the inner diameter of the tapered roller bearing 20, the present embodiment can cope with the cleaning of tapered roller bearings 20 having various outer diameters, and therefore, has high versatility.

Thereafter, the cover 12 is engaged with the upper end of the case 11, and cleaning liquid is fed from the cleaning liquid supply apparatus 14 through the circular pipe 12b to an inner side of the case 110. The upper end side of the case 11 is sealed to the cover 12, and the lower end side of the case 11 is closed by the tapered roller bearing 20, such that a sealed space SP having cleaning liquid retained therein is formed on the inner side of the case 11. Meanwhile, the lower end side of the tapered roller bearing 20 is exposed via the lower part of the case 11 to the atmosphere (predetermined atmosphere).

At this time, the tapered roller bearing 20 is urged toward the lower part of the case 11 by the cleaning liquid pressurized in the sealed space SP. Thereby, the cage 23 is abutted against the tapered inner circumferential surface 11a surely and the inner race 21 is abutted against the tapered outer circumferential surface 13a surely, such that the sealability of the sealed space SP can be enhanced.

By having pressure transmitted from the cleaning liquid supply apparatus 14, the pressure of the cleaning liquid within the sealed space SP becomes high. The pressure of the cleaning liquid in this state is preferably 0.1 MPa to 0.5 MPa, but it can be varied arbitrarily according to the degree of soiling of the tapered roller bearing 20. The pressure is applied to the entire sealed space SP including the gaps formed on the tapered roller bearing 20.

Figure 3:
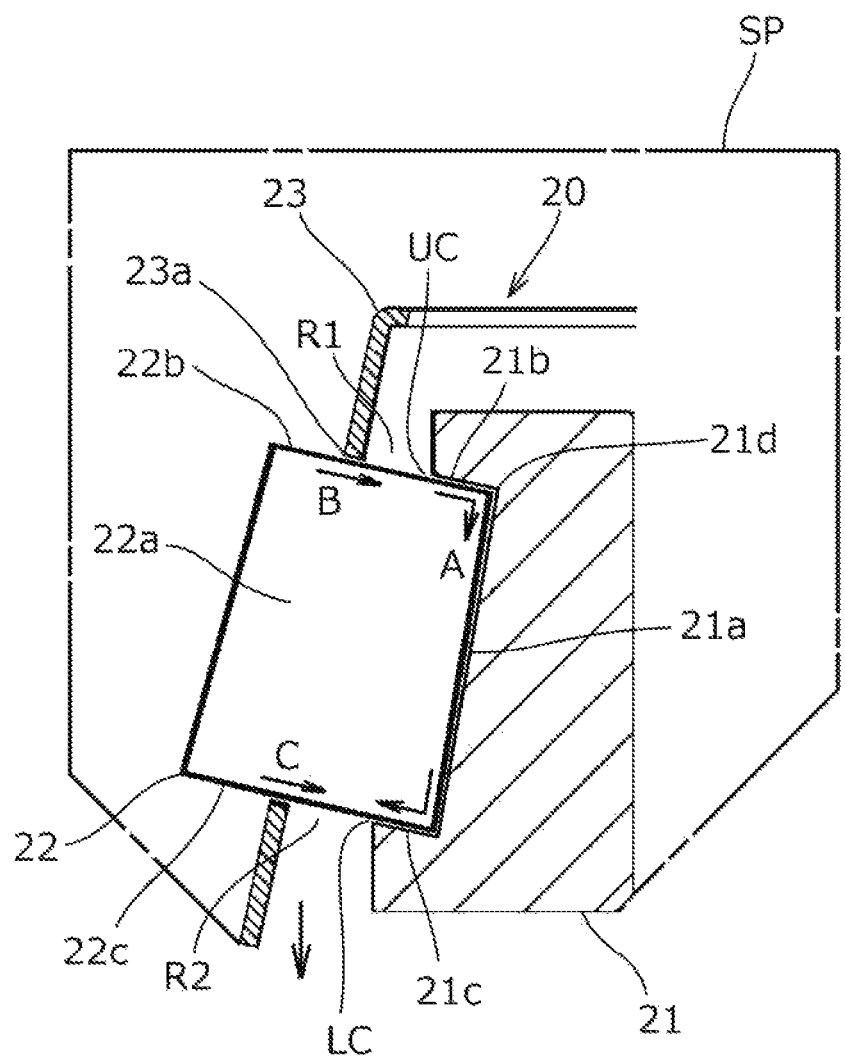
FIG. 3 is a schematic drawing illustrating a cross-section of a periphery of a tapered roller of a tapered roller bearing.

FIG. 3 is a schematic drawing illustrating a cross section of a circumference of the tapered roller 22 of the tapered roller bearing 20. The sealed space SP configured to retain the pressurized cleaning liquid is formed on an outer side of the cage 23 in the radial direction, between the cage 23 and the inner race 21 above the tapered roller 22, and on an inner side of the inner race 21.

A race groove 21d formed on an outer circumference of the inner race 21 includes a race surface 21a on which a rolling contact surface 22a of each tapered roller 22 rolls, an upper side wall 21b opposed to an upper end surface 22b of each tapered roller 22, and a lower side wall 21c opposed to a lower end surface 22c of each tapered roller 22, wherein gaps are formed between the opposing surfaces thereof. A gap between the upper end surface 22b of each tapered roller 22 and the upper side wall 21b is referred to as an upstream side gap (gap on one side in the axial direction) UC and a gap between the lower end surface 22c of each tapered roller 22 and the lower side wall 21c is referred to as a downstream-side gap (gap on the other side in the axial direction) LC.

As can be recognized clearly from FIG. 3, the upstream-side gap UC is in contact with the cleaning liquid retained in the sealed space SP and the downstream-side gap LC is in contact with the atmosphere. Therefore, even if grease is attached in the upstream-side gap UC, the downstream-side gap LC and the circumference thereof, hydraulic pressure of the cleaning liquid is applied on the upstream-side gap UC and atmospheric pressure is applied on the downstream-side gap LC.

In other words, if the cleaning liquid retained within the sealed space SP is pressurized by a pressure higher than atmospheric pressure, the hydraulic pressure of the cleaning liquid in the vicinity of the upstream-side gap UC will become higher than the atmospheric pressure in the vicinity of the downstream-side gap LC. In the description, "vicinity" assumes a case where the upstream-side gap UC and the cleaning liquid or the downstream-side gap LC and the atmosphere are indirectly in contact with each other with grease etc. interposed therebetween.

As described above, a pressure difference is caused between the upstream-side gap UC and the downstream-side gap LC across the whole circumference of the tapered roller bearing 20. Further, since the upstream-side gap UC and the downstream-side gap LC are communicated via the space between the rolling contact surface 22a of the tapered roller 22 and the race surface 21a, the cleaning liquid will gush out through the gasp according to the pressure difference, as illustrated by the arrow A in FIG. 3.

According to the conventional cleaning method, it was difficult to clean off the grease that has been clogged in the upstream-side gap UC, the downstream-side gap LC, or the space between the rolling contact surface 22a of the tapered rollers 22 and the race surface 21a. In contrast, according to the present embodiment, by supplying a pressurized cleaning liquid to the upstream-side gap UP, the adhered grease may be pushed out toward the downstream-side gap LC.

In this state, if the plug 13 is rotated about the axis at a relatively low speed via the actuator 16, the inner race 21 rotates along therewith, by which the tapered roller 22 rolls, such that hidden grease is exposed and cleaned off by the cleaning liquid, according to which the effect of cleaning is enhanced.

Further, the cleaning liquid in the vicinity of the upper end surface 22b of the tapered roller 22 in the space between the cage 23 and the inner race 21 (upstream area R1 within the cage) is gushed out toward the upstream-side gap UC, and along therewith, the cleaning liquid on the outer side of the cage 23 flows through the gap between the upper end surface 22b and the opening 23a of the cage 23 to be gushed to the inner side, as illustrated by the arrow B of FIG. 3. Thereby, the grease attached to the gap between the upper end surface 22b and the openings 23a and in the periphery thereof can be cleaned off.

Further, since the outer side of the cage 23 in the vicinity of the lower end surface 22c of the tapered roller 22 is in contact with the cleaning liquid within the sealed space SP and the inner side of the cage 23 in the vicinity of the lower end surface 22c (downstream area R2 in the inner side of the cage) is in contact with the atmosphere, the cleaning liquid is gushed out through the gap between the lower end surface 22c and the opening 23a of the cage 23 according to the pressure difference between the outer side and the inner side of the cage 23, as illustrated by the arrow C of FIG. 3. Thereby, the grease attached to the gap between the lower end surface 22c and the opening 23a and to the periphery thereof can be cleaned off. Further, the cleaning liquid is similarly passed through the gap between the rolling contact surface 22a of the tapered roller 22 and the opening 23a of the cage 23 according to the pressure difference between the outer side and the inner side of the cage 23, by which the cleaning effect is enhanced.

The cleaning liquid having passed through the respective gaps in the tapered roller bearing 20 and gushed out to the exterior containing grease drops in and is collected by the cleaning liquid pan 17 positioned on the lower direction, and thereafter, is filtered by the filter 17a to be reused.

When the cleaning is finished, the circular pipe 12b can be connected to an air supply source (not shown) by switching a valve etc. not shown. The air fed from the air supply source is blown through the circular pipe 12b onto the tapered roller bearing 20. After the tapered roller bearing 20 had been dried by the air, supply of air is stopped and the cover 12 is removed, by which the tapered roller bearing 20 can be taken out of the case 11. The drying process enables to completely dry even the inner side of the tapered roller bearing 20, such that no dripping of liquid occurs after cleaning, and fouling of the surrounding area can be prevented. Incidentally, a rust preventing agent can be sprayed onto the entire body of the tapered roller bearing 20 through the circular pipe 12b after cleaning and prior to drying.

Comparison with Comparative Examples

Now, an effect of the cleaning method according to the present embodiment will be described by comparison with cleaning methods of comparative examples carried out by the present inventor.

Figure 4:
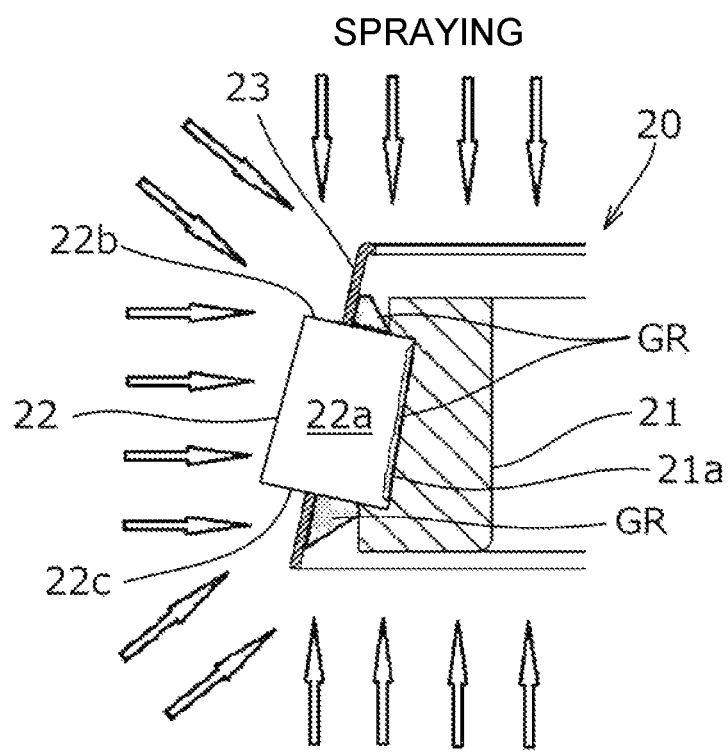
FIG. 4 is a partial cross-sectional view of the tapered roller bearing after executing a cleaning method according to a first comparative example.

FIG. 4 is a partial cross-sectional view of a tapered roller bearing 20 after executing a cleaning method according to a first comparative example. In the first comparative example, a cleaning liquid was sprayed to an upper part, a lower part and a lateral part (including the oblique direction) of the tapered roller bearing 20.

According to this cleaning method, grease GR remained between the cage 23 and the inner race 21 in the vicinity of the upper end surface 22b of the tapered roller 22, between the cage 23 and the inner race 21 in the vicinity of the lower end surface 22c of the tapered roller 22, and between the rolling contact surface 22a and the race surface 21a.

Figure 5:
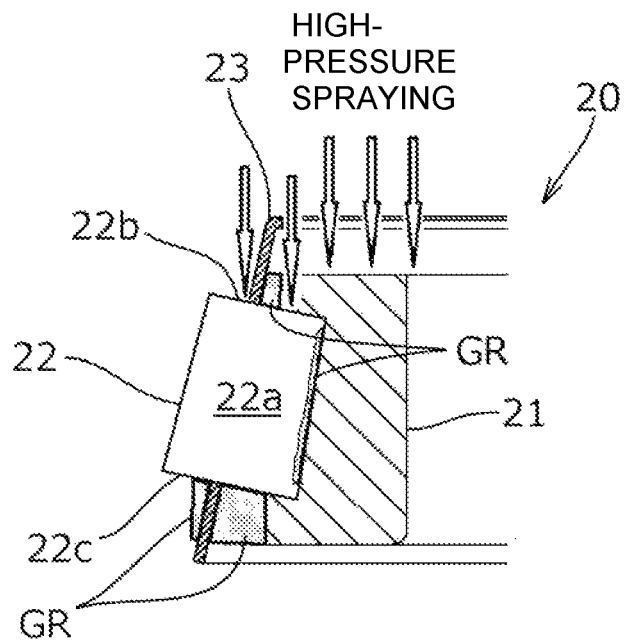
FIG. 5 is a partial cross-sectional view of the tapered roller bearing after executing a cleaning method according to a second comparative example.

FIG. 5 is a partial cross-sectional view of a tapered roller bearing 20 after executing a cleaning method according to a second comparative example. In the second comparative example, a cleaning liquid was sprayed with high pressure from the upper direction of the tapered roller bearing 20.

According to this cleaning method, grease GR on the cage 23 and the inner race 21 in the vicinity of the upper end surface 22b of the tapered roller 22 opposed to the sprayed cleaning liquid was removed more effectively than the first comparative example, but a portion thereof still remained. Further, grease GR attached to the inner and outer sides of the cage 23 in the vicinity of the lower end surface 22c of the tapered roller 22 and that attached between the rolling contact surface 22a and the race surface 21a that are positioned so as not to be exposed to direct spraying could not be cleaned off, and a relatively large amount of grease GR remained. Therefore, it was recognized that the cleaning method according to the second comparative example is not suitable for cleaning off grease GR attached to the inner sides.

Figure 6:
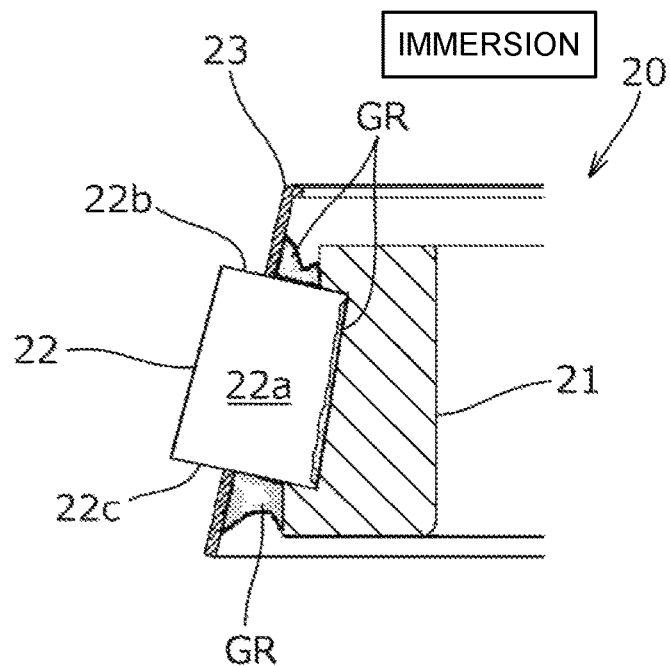
FIG. 6 is a partial cross-sectional view of the tapered roller bearing after executing a cleaning method according to a third comparative example.

FIG. 6 is a partial cross-sectional view of a tapered roller bearing 20 after executing a cleaning method according to a third comparative example. In the third comparative example, the tapered roller bearing 20 was immersed in a cleaning liquid for a long period of time.

According to this cleaning method, grease GR remained between the cage 23 and the inner race 21 in the vicinity of the upper end surface 22b of the tapered roller 22, between the cage 23 and the inner race 21 in the vicinity of the lower end surface 22c of the tapered roller 22, and between the rolling contact surface 22a and the race surface 21a. Therefore, it was recognized that deposited grease GR could not be removed by the cleaning method according to the third comparative example.

Figure 7:
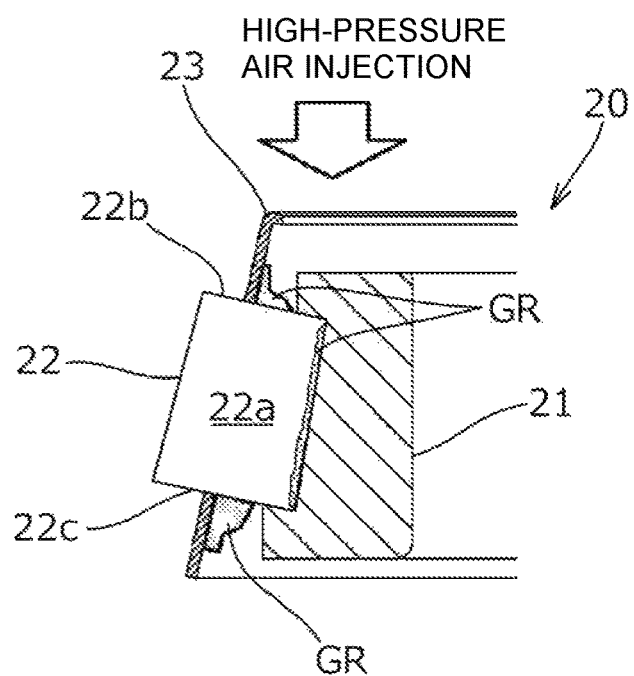
FIG. 7 is a partial cross-sectional view of the tapered roller bearing after executing a cleaning method according to a fourth comparative example.

FIG. 7 is a partial cross-sectional view of the tapered roller bearing 20 after executing a cleaning method according to a fourth comparative example. In the fourth comparative example, high-pressure air was blown from the upper direction to the tapered roller bearing 20.

According to this cleaning method, grease GR remained between the cage 23 and the inner race 21 in the vicinity of the upper end surface 22b of the tapered roller 22, between the cage 23 and the inner race 21 in the vicinity of the lower end surface 22c of the tapered roller 22, and between the rolling contact surface 22a and the race surface 21a. Therefore, it was recognized that cleaning performed using cleaning liquid was more effective than using high-pressure air.

In addition to the above, a method of rotating the tapered roller bearing 20 at high speed and separating the grease by centrifugal force, a method of heating the grease and causing the grease to drop to separate the grease, and a method of accommodating the tapered roller bearing 20 in a decompressed space and causing the grease to vaporize to separate the grease have been attempted, but it was not possible according to any of the methods to effectively remove the grease attached to the inner side of the tapered roller bearing 20.

In contrast, according to the present embodiment described above, the grease attached to the inner side of the tapered roller bearing 20 could be cleaned off easily in a short time (such as approximately 10 minutes), and it was determined that the effect of cleaning was superior to any of the comparative examples, and in addition, cleaning could be performed regardless of the specification (inner and outer diameters, width etc.) of the tapered roller bearing 20.

Other Application Examples

Figure 8:
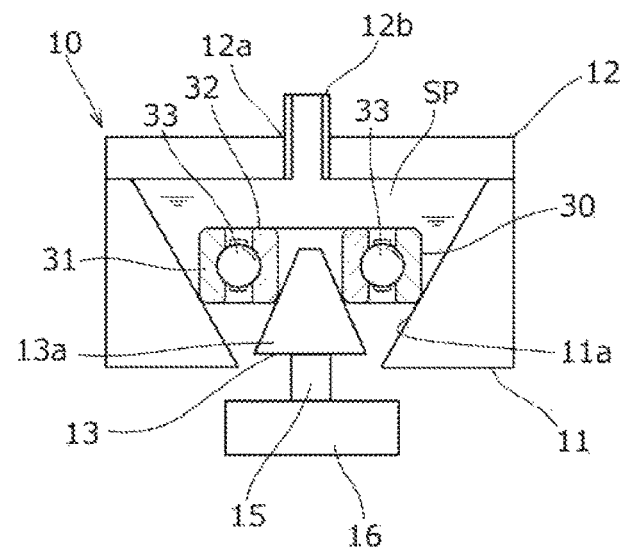
FIG. 8 is a cross-sectional view illustrating an example in which the cleaning device according to the present embodiment is used for cleaning a ball bearing.

FIG. 8 is a cross-sectional view illustrating an example in which the cleaning device 10 according to the present embodiment is used for cleaning a ball bearing 30. The ball bearing 30 includes an outer race 31, an inner race 32, and a plurality of balls 33 arranged between the races 31 and 32.

According to the present embodiment, an outer circumference of a lower end of an outer race 31 of a tapered roller bearing 20 is abutted against a tapered inner circumferential surface 11a of the case 11. The other configurations are similar to the embodiments described above, such that the respective components are denoted with the same reference numbers, and descriptions thereof are omitted.

According to the present embodiment, the upstream-side gap between the races 31 and 32 and the ball 33 is in contact with the cleaning liquid retained in the sealed space SP, and the downstream-side gap between the races 31 and 32 and the ball 33 is in contact with the atmosphere. Therefore, if the cleaning liquid retained in the sealed space SP is pressurized with a pressure higher than the atmospheric pressure, a pressure difference is caused above and below the ball 33 across the entire circumference of the ball bearing 30, and according to this pressure difference, the cleaning liquid above the ball 33 is caused to gush out through the gap between the races 31 and 32 and the ball 33, by which the grease can be cleaned off.

Second Embodiment

Figure 9:
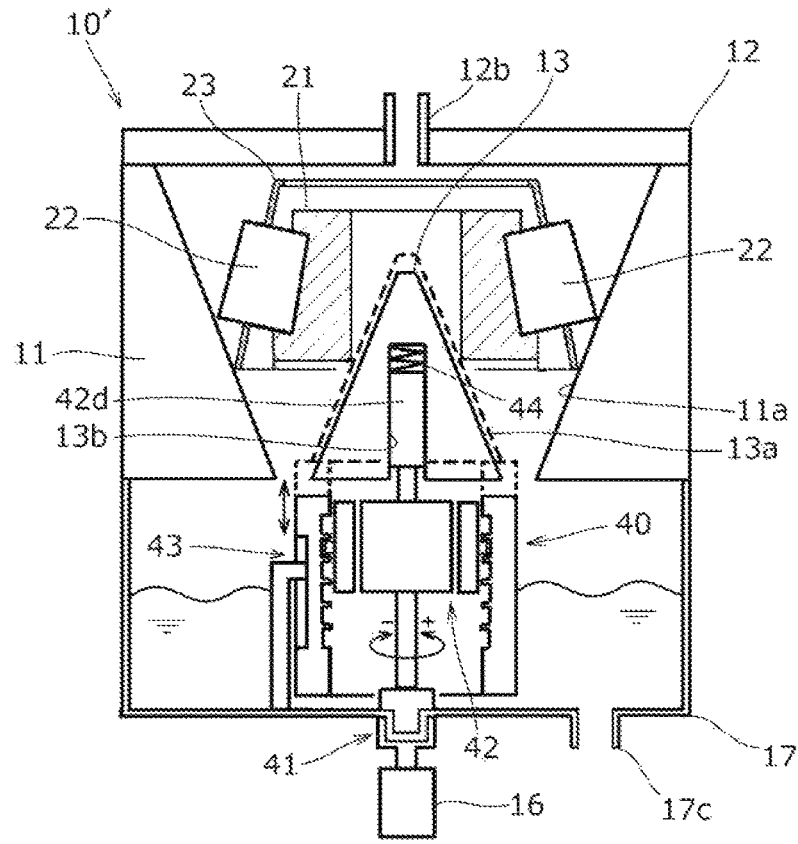
FIG. 9 is a schematic diagram of a rolling bearing cleaning device according to a second embodiment.
Figure 10:
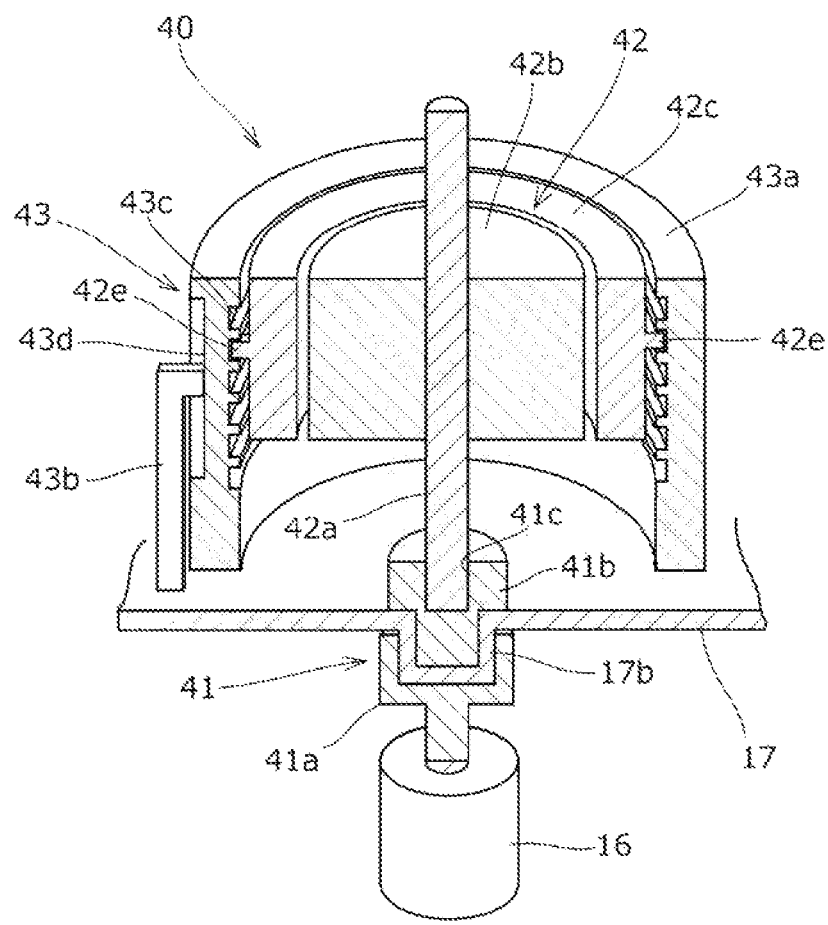
FIG. 10 is a cross-sectional perspective view of a cleaning device drive mechanism according to the second embodiment.

FIG. 9 is a schematic diagram of a rolling bearing cleaning device 10' according to a second embodiment. FIG. 10 is a cross-sectional perspective view of a drive mechanism 40 of the cleaning device 10' according to the second embodiment. The drive mechanism 40 can be used in common for the cleaning devices 10 illustrated in FIG. 1 and FIG. 8. The case 11, the cover 12, and the plug 13 are similar to the embodiment described above, such that the descriptions thereof are omitted.

The drive mechanism 40 includes a first magnetic coupling 41 coupled to an actuator (motor) 16, a second magnetic coupling 42, and a conversion mechanism 43 for converting a rotary movement into a translatory movement. The second magnetic coupling 42 and the conversion mechanism 43 constitute a lifting mechanism. The first magnetic coupling 41 and the second magnetic coupling 42 are contactless couplings that transfer driving force in a noncontact manner.

In FIG. 10, a bottomed circular tube portion 17b that protrudes downward is formed at a bottom of the cleaning liquid pan 17. The first magnetic coupling 41 includes a first driving cylinder 41a arranged in a manner fit to an outer circumference of the bottomed circular tube portion 17b, and a first driven cylinder 41b arranged in a manner fit to an inner circumference of the bottomed circular tube portion 17b. An inner circumference of the first driving cylinder 41a is magnetized, and N poles and S poles are arranged alternatively along the circumferential direction. Further, in correspondence therewith, an outer circumference of the first driven cylinder 41*b* is magnetized, and S poles and N poles are arranged alternatively along the circumferential direction. The first driving cylinder 41*a* is coupled to the actuator 16 and is driven to rotate thereby. A fitting hole 41*c* is formed on an upper surface of the first driven cylinder 41*b*.

The second magnetic coupling 42 includes a shaft 42*a*, a second driving cylinder 42*b* secured to a circumference of the shaft 42*a*, and a second driven cylinder 42*c* arranged in a circumference of the second driving cylinder 42*b*. A lower end of the shaft 42*a* is fit to the fitting hole 41*c* and moved integrally in rotation therewith, and a rectangular column portion 42*d* is formed on an upper end of the shaft 42*a* (refer to FIG. 9). The rectangular column portion 42*d* is accommodated in a blind hole 13*b* having a rectangular cross section formed at a center of a lower surface of the plug 13, wherein the rectangular column portion 42*d* is capable of relative movement in an axial direction with respect to the blind hole 13*b* but is driven to rotate integrally in the rotational direction. A coil spring 44 is arranged between a depth end of the blind hole 13*b* and the rectangular column portion 42*d*.

In FIG. 10, an outer circumference of the second driving cylinder 42*b* is magnetized, and N poles and S poles are arranged alternatively along the circumferential direction. Further, in correspondence therewith, an inner circumference of the second driven cylinder 41*c* is magnetized, and S poles and N poles are arranged alternatively along the circumferential direction. Although not illustrated, by interposing a thin-walled tube made of resin between the second driving cylinder 42*b* and the second driven cylinder 42*c*, eccentricity of the second driven cylinder 42*c* with respect to the second driving cylinder 42*b* by magnetic attraction can be prevented. A plurality of followers 42*e* are formed at regular intervals in the circumferential direction on the outer circumference of the second driven cylinder 42*c*. The second driving cylinder 42*b* and the second driven cylinder 42*c* constitute a rotary unit, and a magnetic pole magnetized by the second driving cylinder 42*b* and a magnetic pole magnetized by the second driven cylinder 42*c* constitute a limiting device.

The conversion mechanism 43 includes a rectilinear advance cylinder 43*a* disposed around the second driven cylinder 42*c*, and a key member 43*b* implanted on a bottom surface of the cleaning liquid pan 17. A spiral groove 43*c* to which the followers 42*e* engage in a relatively movable manner is formed on the inner circumference of the rectilinear advance cylinder 43*a*, and a rectilinear groove 43*d* that extends in an axial direction is formed on the outer circumference of the rectilinear advance cylinder 43*a*. A tip of the key member 43*b* that is bent in a hook shape is engaged to the rectilinear groove 43*d* in a relatively movable manner.

The operation of the drive mechanism 40 will be described. Prior to cleaning, as illustrated by the dotted line of FIG. 9, the actuator 16 is operated in a state where the cover 12 is removed from the case 11, such that the plug 13 together with the rectilinear advance cylinder 43*a* is moved to the upper position. The state of movement of the rectilinear advance cylinder 43*a* will be described later. In this state, if an operator places the inner circumference of the lower end of the inner race 21 of the tapered roller bearing 20 to the tapered outer circumferential surface 13*a* of the plug 13, the coil spring 44 is compressed by the weight of the tapered roller bearing 20. Further, after attaching the cover 12 to the case 11, when a power is supplied to the actuator 16 from a power supply source not shown, the first driving cylinder 41*a* rotates in a positive direction. Then, the first driven cylinder 41*b* is also rotated together in the positive direction by magnetic attraction interposing the circumferential wall of the bottomed circular tube portion 17*b*.

According to the first magnetic coupling 41, since driving force is transmitted from the first driving cylinder 41*a* to the first driven cylinder 41*b* in a noncontact manner, even in a state where the cleaning liquid is retained in the cleaning liquid pan 17, the leaking of cleaning liquid other than through a drain port 17*c* can be prevented.

Moreover, the shaft 42*a* is rotated in the positive direction together with the first driven cylinder 41*b*, and the second driving cylinder 42*b* is also rotated in the same direction. In this state, if the load received by the second driven cylinder 42*c* (which, according to the present example, is the resistance corresponding to the forward rotation) is a predetermined value or less, the second driven cylinder 42*c* is driven to rotate in the positive direction by being co-rotated with the second driving cylinder 42*b* by magnetic attraction. Meanwhile, the rectilinear advance cylinder 43*a* is capable of moving only in the axial direction by the engagement of the key member 43*b* and the rectilinear groove 43*d*, such that even when the second driven cylinder 42*c* is rotated in the positive direction, it will not be rotated in the same direction. Instead, the followers 42*e* of the second driven cylinder 42*c* are moved along the spiral groove 43*c*.

Further, relative displacement of the second driving cylinder 42*b* and the second driven cylinder 42*c* in the axial direction is prevented by magnetic attraction. Therefore, the side wall of the spiral groove 43*c* receives force in the axial direction from the moving followers 42*e*, and the rectilinear advance cylinder 43*a* is lowered along the axial direction. In this state, the key member 43*b* to which the rectilinear groove 43*d* is engaged serves as a rectilinear guide of the rectilinear advance cylinder 43*a*.

Along with the lowering of the rectilinear advance cylinder 43*a*, the plug 13 and the tapered roller bearing 20 are also lowered while being rotated, such that the lower end of the cage 23 is abutted against the tapered inner circumferential surface 11*a* of the case 11, and the tapered roller bearing 20 is retained in the case 11. Even in a case where the axis line of the tapered roller bearing 20 is inclined with respect to the axis line of the plug 13 when being attached, by rotating and lowering the tapered roller bearing 20, the position of the tapered roller bearing 20 with respect to the plug 13 can be corrected such that the axis lines thereof are aligned when the cage 23 is abutted against the tapered inner circumferential surface 11*a*. When the rectilinear advance cylinder 43*a* is lowered further, the upper end thereof is separated from the lower surface of the plug 13. However, since the plug 13 is urged upward by the urging force of the coil sprint 44, it remains abutted against the inner race 21.

When the rectilinear advance cylinder 43*a* is lowered further to reach the end of movement range, a load exceeding the predetermined value is generated, such that the second driven cylinder 42*c* will no longer be co-rotated with the second driving cylinder 42*b*. Therefore, the rectilinear advance cylinder 43*a* will not be lowered further even though the shaft 42*a* is still rotated. In other words, the second magnetic coupling 42 has a function as a clutch to disconnect the transmission of driving force from the second driving cylinder 42*b* to the second driven cylinder 42*c*. Thereafter, by supplying cleaning liquid to the sealed space SP, the tapered roller bearing 20 will remain pressed against the tapered inner circumferential surface 11a and the tapered outer circumferential surface 13a, such that cleaning is enabled.

Meanwhile, even if rotation of the second driven cylinder 42c to the positive direction is restricted due to a load that exceeds the predetermined value, the second driving cylinder 42b can rotate independently from the second driven cylinder 42c as long as a driving force that exceeds the magnetic attraction operating between the second driving cylinder 42b and the second driven cylinder 42c is applied. Further, as mentioned above, the plug 13 maintains a state abutted against the inner circumference of the lower end of the inner race 21 by the urging force of the coil spring 44.

Therefore, when cleaning the tapered roller bearing 20, the shaft 42a is rotated by the rotation of the actuator 16, and the plug 13 is rotated together with the rectangular column portion 42d, such that the roller 22 can be rolled along the race 21.

After completing the cleaning and drying processing, when the tapered roller bearing 20 is to be exchanged, a power having reverse characteristics is supplied to the actuator 16, according to which the first driving cylinder 41a is rotated in the negative direction. Thereby, in contrast to the aforementioned description, the first driven cylinder 41b, the second driving cylinder 42b and the second driven cylinder 42c are rotated in the negative direction, and thereby, the tapered roller bearing 20 can be lifted together with the rectilinear advance cylinder 43a and the plug 13. After removing the cover 12 from the case 11, the operator can take out the case 11 by holding the tapered roller bearing 20 being exposed. According to the present embodiment, the device is applicable to tapered roller bearings 20 having different diameters.

As described, the cleaning device and method for cleaning the roller bearing according to the present embodiment can be applied to cleaning not only rolling bearings for aircrafts but also rolling bearings for railway vehicles, heavy machinery, machine tools, and so on.

DESCRIPTION OF THE REFERENCE NUMERAL 10, 10' cleaning device, 11 case, 12 cover, 13 plug, 14 cleaning liquid supply apparatus, 15 drive shaft, 16 actuator, 17 cleaning liquid pan, 20 tapered roller bearing, 21 inner race, 22 tapered roller, 23 cage, 30 ball bearing, 331 outer race, 32 inner race, 33 ball, 40 drive mechanism.

The invention claimed is:

1. A method for cleaning a rolling bearing including a plurality of rolling elements, and a race provided with a race groove along which the rolling elements roll, the method comprising:
   arranging a cleaning liquid in a pressurized state on one side in an axial direction of the rolling bearing across a whole circumference thereof with respect to a gap between the rolling elements and the race groove; and
   cleaning the rolling bearing by passing the cleaning liquid through the gap from one side in the axial direction toward the gap on the other side thereof;
   an upstream end of the whole circumference of the rolling bearing is contained within a sealed space, and the cleaning liquid is filled in the sealed space and is put to the pressurized state to force the liquid across the whole circumference and in the axial direction through the gap.

2. The method for cleaning a rolling bearing according to claim 1,
   wherein the rolling bearing comprises a cage configured to retain the rolling elements, and on an inner side of the cage is formed an upstream area that receives a hydraulic pressure of the cleaning liquid and a downstream area that is exposed to an atmospheric pressure, and
   wherein the hydraulic pressure of the cleaning liquid is set higher than the atmospheric pressure at the downstream area across the whole circumference of the rolling bearing.

3. The method for cleaning a rolling bearing according to claim 2,
   wherein the cage comprises openings in which the rolling elements are accommodated, and the cleaning liquid is flown from an outer side of the cage toward an inner side of the cage through a gap between the rolling elements and the openings.

4. The method for cleaning a rolling bearing according to claim 3, wherein the race is rotated.

5. The method for cleaning a rolling bearing according to claim 1,
   wherein the race is rotated.

* * * * *